US010301226B2

(12) United States Patent
Evans

(10) Patent No.: US 10,301,226 B2
(45) Date of Patent: May 28, 2019

(54) PH ADJUSTED ORGANIC FERTILIZER FROM ANAEROBIC DIGESTATE AND GRAIN BY-PRODUCTS

(71) Applicant: True Organic Products, Inc., Helm, CA (US)

(72) Inventor: Jacob Matthew Evans, Pebble Beach, CA (US)

(73) Assignee: True Organic Products, Inc., Helm, CA (US)

( * ) Notice: Subject to any disclaimer, the term of this patent is extended or adjusted under 35 U.S.C. 154(b) by 490 days.

(21) Appl. No.: 15/098,120

(22) Filed: Apr. 13, 2016

(65) Prior Publication Data
US 2017/0297963 A1   Oct. 19, 2017

(51) Int. Cl.
| *C05F 5/00* | (2006.01) |
| *C05F 11/00* | (2006.01) |
| *C05C 11/00* | (2006.01) |
| *A01C 21/00* | (2006.01) |
| *C05B 17/00* | (2006.01) |
| *C05G 3/00* | (2006.01) |

(52) U.S. Cl.
CPC .............. *C05C 11/00* (2013.01); *A01C 21/00* (2013.01); *C05B 17/00* (2013.01); *C05F 5/00* (2013.01); *C05F 5/002* (2013.01); *C05F 5/004* (2013.01); *C05F 5/006* (2013.01); *C05F 5/008* (2013.01); *C05F 11/00* (2013.01); *C05G 3/0005* (2013.01)

(58) Field of Classification Search
None
See application file for complete search history.

(56) References Cited

U.S. PATENT DOCUMENTS

| 1,501,916 A | 7/1924 | Nikaido |
| 1,599,185 A | 9/1926 | Reich |
| 1,631,252 A | 6/1927 | Dickerson |
| 2,049,524 A | 8/1936 | Stillwell |
| 2,117,087 A | 5/1938 | Formhals |
| 2,315,422 A | 3/1943 | Hildebrandt |
| 2,626,237 A | 1/1953 | Warren |

(Continued)

FOREIGN PATENT DOCUMENTS

| CN | 102391030 | 3/2012 |
| CN | 102674972 | 9/2012 |

(Continued)

OTHER PUBLICATIONS

Wiedmeier et al., "Effects of Concentrated Separator Dried Beet Pulp on Nutrient Digestibility, Milk Production, and Preference of Holstein Cattle", Journal of Dairy Science, 1994, vol. 77, No. 10, pp. 3051-3057.

(Continued)

*Primary Examiner* — Wayne A Langel
(74) *Attorney, Agent, or Firm* — Hawley Troxell Ennis & Hawley LLP; Philip McKay

(57) ABSTRACT

A process for production of anaerobic digestate based organic fertilizer includes combining anaerobic digestate and one or more grain by-products to create a combination of anaerobic digestate and one or more grain by-products. The combination of anaerobic digestate and one or more grain by-products is processed to yield the pH adjusted anaerobic digestate based organic fertilizer product.

12 Claims, 4 Drawing Sheets

(56) References Cited

U.S. PATENT DOCUMENTS

| | | | |
|---|---|---|---|
| 2,738,264 A | 3/1956 | Watson | |
| 2,797,986 A | 7/1957 | Zirm | |
| 3,284,209 A | 11/1966 | Kelley | |
| 3,445,220 A | 5/1969 | Anderson | |
| 3,983,255 A | 9/1976 | Bass | |
| 4,126,439 A | 11/1978 | Stekoll | |
| 4,230,485 A | 10/1980 | Ohlrogge | |
| 4,383,846 A | 5/1983 | Newsom | |
| 4,424,151 A | 1/1984 | Grealy et al. | |
| 4,604,125 A | 8/1986 | Robertiello et al. | |
| 4,743,287 A | 5/1988 | Robinson | |
| 4,975,106 A | 12/1990 | Ferguson | |
| 4,997,469 A | 3/1991 | Moore | |
| 5,177,008 A | 1/1993 | Kampen | |
| 5,177,009 A | 1/1993 | Kampen | |
| 5,221,313 A | 6/1993 | Mortvedt et al. | |
| 5,393,318 A | 2/1995 | Iizuka et al. | |
| 5,631,001 A | 5/1997 | Harich et al. | |
| 5,634,959 A | 6/1997 | Beaty | |
| 5,772,721 A | 6/1998 | Kazemzadeh | |
| 5,851,953 A | 12/1998 | Pehu et al. | |
| 5,952,267 A | 9/1999 | Mottram | |
| 6,083,293 A | 7/2000 | Bath | |
| 6,174,472 B1 | 1/2001 | Johnson et al. | |
| 6,241,795 B1 | 6/2001 | Svec et al. | |
| 6,318,023 B1 | 11/2001 | Yamashita | |
| 6,352,569 B1 | 3/2002 | Beran et al. | |
| 6,384,266 B1 | 5/2002 | Farone et al. | |
| 6,468,562 B2 | 10/2002 | Moilanen et al. | |
| 6,524,600 B2 | 2/2003 | Yamashita | |
| 6,572,669 B1 | 6/2003 | Creech | |
| 6,602,824 B1 | 8/2003 | Miles et al. | |
| 7,018,669 B2 | 3/2006 | Kosaka et al. | |
| 7,045,165 B2 | 5/2006 | Westberg | |
| 7,074,251 B1 | 7/2006 | Rogers et al. | |
| 7,678,171 B2 | 3/2010 | Beckley et al. | |
| 7,901,481 B2 | 3/2011 | Evans | |
| 7,927,397 B1 | 4/2011 | Evans | |
| 8,262,765 B2 | 9/2012 | Summer et al. | |
| 8,444,742 B2 | 5/2013 | Smith et al. | |
| 9,604,887 B2 | 3/2017 | Evans | |
| 2002/0048605 A1 | 4/2002 | Moilanen et al. | |
| 2002/0186614 A1 | 12/2002 | Millward | |
| 2003/0066322 A1 | 4/2003 | Perriello | |
| 2003/0172697 A1 | 9/2003 | Sower | |
| 2004/0035162 A1 | 2/2004 | Williams et al. | |
| 2004/0062832 A1 | 4/2004 | Kemp | |
| 2004/0065127 A1 | 4/2004 | Connell | |
| 2004/0121914 A1 | 6/2004 | Catalano | |
| 2005/0119127 A1 | 6/2005 | Cambri et al. | |
| 2006/0228323 A1 | 10/2006 | Novelle et al. | |
| 2006/0243009 A1 | 11/2006 | Burnham | |
| 2006/0254331 A1 | 11/2006 | Burnham | |
| 2007/0102352 A1 | 5/2007 | Burke | |
| 2007/0134376 A1 | 6/2007 | Connell | |
| 2007/0261451 A1 | 11/2007 | Beckley et al. | |
| 2007/0292564 A1 | 12/2007 | Hu et al. | |
| 2009/0211322 A1 | 8/2009 | Skinner | |
| 2010/0071429 A1 | 3/2010 | Von Nordenskjold | |
| 2010/0136629 A1* | 6/2010 | Li | C05F 3/00 435/72 |
| 2011/0247378 A1 | 10/2011 | Begley et al. | |
| 2012/0011910 A1* | 1/2012 | Daniels | C05F 1/007 71/22 |
| 2012/0028801 A1 | 2/2012 | Daniels et al. | |
| 2012/0231494 A1* | 9/2012 | Li | C02F 3/28 435/41 |
| 2013/0130902 A1 | 5/2013 | Roose et al. | |
| 2014/0047881 A1 | 2/2014 | Roberts | |
| 2014/0060130 A1 | 3/2014 | Purtle | |
| 2014/0144195 A1* | 5/2014 | Callendrello | C05F 17/0018 71/10 |
| 2015/0135784 A1 | 5/2015 | Milnes | |
| 2016/0176768 A1 | 6/2016 | Norddahl et al. | |
| 2017/0036966 A1 | 2/2017 | Evans | |
| 2017/0297962 A1 | 10/2017 | Evans | |

FOREIGN PATENT DOCUMENTS

| | | |
|---|---|---|
| CN | 102875238 | 1/2013 |
| CN | 103524175 | 1/2014 |
| CN | 103724128 | 4/2014 |
| CN | 102898195 | 6/2014 |
| CN | 103936500 | 7/2014 |
| CN | 104058810 | 9/2014 |
| CN | 104151018 | 11/2014 |
| CN | 104291971 | 1/2015 |
| CN | 104303670 | 1/2015 |
| CN | 104892086 | 9/2015 |
| DE | 4324823 | 2/1994 |
| EP | 0145792 | 6/1985 |
| EP | 0411780 | 2/1991 |
| GB | 663133 | 12/1951 |
| JP | 63-107907 | 5/1988 |
| JP | 01208386 | 8/1989 |
| JP | 02-225388 | 9/1990 |
| JP | 04-198080 | 7/1992 |
| JP | 05-043370 | 2/1993 |
| JP | 06107511 | 4/1994 |
| JP | 2004-113032 | 4/2004 |
| JP | 2004-168614 | 6/2004 |
| JP | 4757447 | 8/2011 |
| KR | 100839201 | 6/2008 |
| KR | 101361521 | 2/2014 |
| PL | 159135 | 11/1992 |
| WO | WO 97-24933 | 7/1997 |
| WO | WO 2009-096628 | 8/2009 |
| WO | WO 2013-078365 | 5/2013 |

OTHER PUBLICATIONS

Kearney et al., "Raw Juice Chromatographic Separation Process", Proceedings from the 28th Biennial ASSBT Meeting, Operations, New Orleans, LA, Mar. 8-11, 1995, Amalgamated Research, Inc., pp. 1-5.

Midwest AGRI Commodities, "Raffinate (Desugared Beet Molasses)", Jul. 10, 2001, 1 page.

Diaz-Zorita, "Applications of Foliar Fertilizers Containing Glycinebetaine Improve Wheat Yields," Argentina Journal of Agronomy and Crop Science (Impact Factor: 2.62), Dec. 2001; 186(3): 209-215.

Decloux et al. "Interest of electrodialysis to reduce potassium level in vinasses." Desalination 146 (2002) pp. 393-398.

Naidu, et al., "Glycinebetaine foliar application increases pasture winter growth and milk yield," Proceedings of the 11th Australian Agronomy Conference, Feb. 2-6, 2003, 2 pages, Geelong, Victoria.

Evans, Analytical Data, 2004-2006.

Evans, "Concentrated Separator By-Product Based Fertilizer," U.S. Appl. No. 12/931,323, filed Jan. 27, 2011.

"Natural Betaine in Personal Care;" DuPont Industrial Biosciences, Jan. 2012. [online], [retrieved Feb. 6, 2017]. Retrieved from the internet <http://www.in-cosmetics.com/_novadocuments/7930>.

Gao, et al., "Effect of spraying glycine betaine on physiological responses of processing tomato under drought stress," Journal of Plant Nutrition and Fertilizer, 2012, 18(2): 426-432.

"Betaine Plant Fertilizer, Betaine Plant Fertilizer Suppliers and Manufacturers at Alibaba.com," [online], [retrieved Feb. 24, 2015]. Retrieved from the internet <URL: http://www.alibaba.com/showroom/betaine-plant-fertilizer.htm>.

Fernandez-Salvador, Javier, et al.; "Liquid Corn and Fish Fertilizers Are Good Options for Fertigation in Blackberry Cultivars Grown in an Organic Production System;" HortScience Feb. 2015 vol. 50 No. 2 pp. 225-233.

Evans, "Fish Soluble By-Product and Grain By-Product Based Organic Fertilizer," U.S. Appl. No. 15/150,047, filed May 9, 2016.

(56) References Cited

OTHER PUBLICATIONS

Evans, "Fish By-Product Based Organic Fertilizer," U.S. Appl. No. 15/152,330, filed May 11, 2016.

* cited by examiner

PH ADJUSTED ORGANIC FERTILIZER FROM ANAEROBIC DIGESTATE AND GRAIN BY-PRODUCTS

BACKGROUND

As the world's population continues its rapid growth, there is a rising issue of waste disposal. Food waste is no exception. For example, in the United States, it is estimated that food loss accounts for 133 billion pounds of waste per year and, unsurprisingly, has an incredible impact on the environment. This waste accounts for over twenty percent of total U.S. municipal solid waste discards after recycling and composting. Shockingly, wasted food accounts for the single largest component of disposed municipal solid waste.

Furthermore, food waste is a leading contributor to landfill methane emissions, which themselves constitute approximately 18 percent of total methane emissions in the United States. Indeed, landfills are the third largest methane source in the United States.

Because of the significant issues presented by disposing of food waste, the government has begun implementing programs to mitigate the effects of wasted food. At a state level, attempts are being made to address food waste disposal issues. For example, in California, where 5.6 million tons of annual food waste make up 18.1% of the state's overall waste stream, the California government passed a law requiring businesses to recycle "organic waste," which is defined as "food waste, green waste, landscape and pruning waste, nonhazardous wood waste, and food-soiled paper waste that is mixed in with food waste." CAL. PUB. RES. CODE § 42649.8 (2015). Since businesses will no longer be able to divert their organic waste to landfills, they are scrambling to determine how to dispose of these materials.

One solution is anaerobic digestion. Occurring naturally in oxygen-poor environments like marshes and landfills, anaerobic digestion takes place when microorganisms break down biodegradable material in the absence of oxygen. Commercially, anaerobic digestion technologies are used to break down widely available waste materials such as livestock manure, municipal wastewater solids, food waste, industrial wastewater and residuals, fats, oils, and grease. Thus, anaerobic digesters can be used to dispose of food waste and other biodegradable materials.

The by-products of anaerobic digestion include biogas, digestate, and water. Biogas, such as methane ($CH_4$) and carbon dioxide ($CO_2$), can be combusted to generate electricity and heat or can be processed into renewable natural gas and transportation fuels.

The anaerobic digestates that result from anaerobic digestion include solid and liquid residues with alkaline pH levels. Problematically, the anaerobic digestates often contains elements that cannot be digested by the anaerobic microorganisms on which the anaerobic digestion process depends. Depending on their source, digestates can contain pathogens, which can lead to human, animal, or plant disease. Furthermore, the digestates may be contaminated with heavy metals, inorganic compounds such as ammonia, and organic compounds. Additionally, the content of macroelements, particularly nitrogen, phosphorous and potassium must be considered. Moreover, anaerobic digestates may have an undesirable appearance and odor.

Although anaerobic digestion is sometimes touted as a panacea to food waste disposal issues, the reality is that the anaerobic digestates themselves must be distributed. There is a need for an environmentally benign product derived from anaerobic digestates that is produced in such a way as to minimize the problems associated with anaerobic digestates.

SUMMARY

The present Inventor, recognizing the issues associated with anaerobic digestates, has developed a method of producing a pH adjusted organic fertilizer by combining and processing anaerobic digestates with grain by-products.

Anaerobic digestates contain levels of available nitrogen, particularly in the form of ammonia, as well as other nutrients that are beneficial for plant growth. In fact, ammonia contamination in anaerobic digestates is a long-standing and well-recognized problem. As mentioned above, anaerobic digestates are unstable and too alkaline for use as general fertilizer.

Soils are either acidic, neutral, or alkaline and their pHs can be affected by various factors, including fertilizers. Importantly, soil pH directly affects nutrient availability, thus directly affecting plant growth. Furthermore, plants have specific soil pH requirements. Therefore, optimal plant growth is dependent on an optimal pH. Some experts consider a slightly acidic soil to be ideal as a slightly acidic soil pH is thought to optimize micro- and macronutrient availability while minimizing the toxicity of availability of nutrients in the soil. Thus, without additional processing, the alkalinity of anaerobic digestates render them inappropriate for fertilizing most soils.

Furthermore, without treatment, the anaerobic digestate undergoes continuing microbial activity, which results in a rotted and ruined product. Compounding this issue, under National Organic Program standards, the regulatory framework governing organic food production, stabilizers such as phosphoric acid and sulfuric acid that can prevent spoliation may not be added to anaerobic digestates that are to be used in organic fertilizer products.

The Inventor, however, recognized that grain by-products such as corn steep liquor are acidic substances and that through combination with anaerobic digestates, can neutralize the anaerobic digestates, ultimately resulting in a fertilizer product that is more neutral or near-neutral than raw anaerobic digestates and is organic under the National Organic Program guidelines.

In accordance with one embodiment, a process of production of a pH adjusted anaerobic digestate based organic fertilizer product is disclosed. In one embodiment, anaerobic digestate is obtained. In one embodiment, one or more grain by-products are obtained.

In one embodiment, the one or more grain by-products include, but are not limited to, one or more of the following: corn steep liquor, wet distillers grains, dried distillers grains with solubles, fermented grain solubles, corn condensed distillers solubles, and/or any other grain by-products as defined herein, known in the art at the time of filing, or developed thereafter. As incidental products of grain processing, these grain by-products are readily available. For example, corn steep liquor is a by-product of corn wet-milling. Grain by-products are a nitrogen source and, when combined with anaerobic digestates, alter the nutrient value of the resulting pH adjusted anaerobic digestate based organic fertilizer.

In one embodiment, the anaerobic digestate and the one or more grain by-products are combined to yield the pH adjusted anaerobic digestate based organic fertilizer product. In one embodiment, the anaerobic digestate is combined with the one or more grain by-products such that the resulting combination of anaerobic digestate and one or more grain by-products is 10% to 90% anaerobic digestate. In one embodiment, the anaerobic digestate is combined with the one or more grain by-products such that the resulting combination of anaerobic digestate and one or more grain by-products is 10% to 90% one or more grain by-products. In other embodiments, the anaerobic digestate is combined with one or more grain by-products such that the resulting combination of anaerobic digestate and one or more grain by-products is any desired percentage concentration of anaerobic digestate and one or more grain by-products.

In one embodiment, the combination of anaerobic digestate and one or more grain by-products is filtered to remove suspended particulate matter. In one embodiment, filtration is provided using a wire mesh size in a range of 50 to 200.

In one embodiment, the combination of anaerobic digestate and one or more grain by-products is aerated.

In one embodiment, the combination of anaerobic digestate and one or more grain by-products is optionally heat-treated. In one embodiment, the combination of anaerobic digestate and one or more grain by-products is optionally heat-treated and filtered to remove suspended particulate matter.

In one embodiment, the optional heat-treatment is performed in a range of about 130 to 200 degrees Fahrenheit (F) for up to 15 days.

In one embodiment, the heat-treated combination of anaerobic digestate and one or more grain by-products is cooled to yield the pH adjusted anaerobic digestate based organic fertilizer product.

In one embodiment, the heat-treated combination of anaerobic digestate and one or more grain by-products is filtered pre- and/or post-cooling. In one embodiment, filtration is provided using a wire mesh size in a range of 50 to 200.

In one embodiment, the pH adjusted anaerobic digestate based organic fertilizer product is applied to fields of agricultural vegetation in quantities in the approximate range of 5 to 4000 gallons per acre. In one embodiment, the pH adjusted anaerobic digestate based organic fertilizer product disclosed herein is applied to the fields of agricultural vegetation either directly or by inclusion in an irrigation stream.

Using the process for production of a pH adjusted anaerobic digestate based organic fertilizer product disclosed herein, a pH adjusted anaerobic digestate based organic fertilizer product is provided that is environmentally benign; is non-pathogenic; is derived from a natural organic source; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

As discussed in more detail below, using the below embodiments, with little or no modification and/or user input, there is considerable flexibility, adaptability, and opportunity for customization to meet the specific needs of various users under numerous circumstances.

Figure 1:
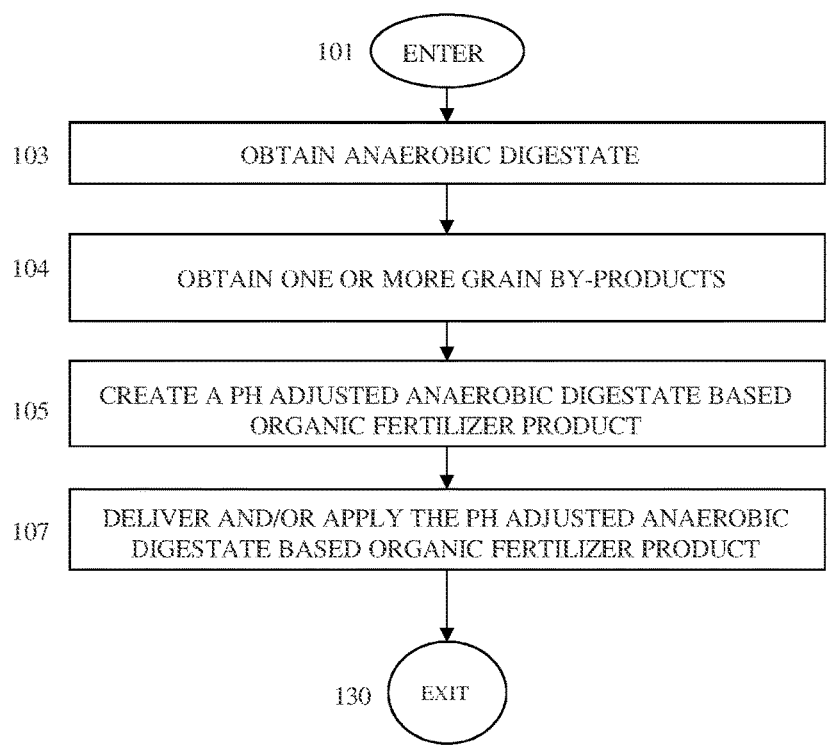
FIG. 1 is a flow chart of a process for organic fertilization using a pH adjusted anaerobic digestate based organic fertilizer product, in accordance with one embodiment.

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying figures, which depict exemplary embodiments. Embodiments may be embodied in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

In accordance with one embodiment, a process for organic fertilization using anaerobic digestates includes creating a pH adjusted anaerobic digestate based organic fertilizer product and applying the pH adjusted anaerobic digestate based organic fertilizer product to agricultural vegetation and/or the fields/soil/substrate supporting the agricultural vegetation as a method of organic fertilization of the agricultural vegetation.

The term "additive" includes liquid fish products; concentrated separator by-product; betaine; alfalfa meal; compost; cottonseed meal; kelp and/or seaweed meal; soybean meal; humus; manure; guano; feather meal; blood meal; Chilean nitrate of soda; Epsom salt, greensand; sulfuric acid; sulfate; phosphoric acid; phosphate; calcium sulfate; gypsum; boron; boric acid; calcium phosphate; bone meal; hard-rock phosphate; soft-rock phosphate; calcium carbonate; limestone; and/or any other additives as known in the art at the time of filing and/or as developed after the time of filing. These additives represent significant contributions of nutrients including macronutrients nitrogen, phosphorus, and potassium. In fertilizers, an NPK value represents the relative content of the elements nitrogen, phosphorus, and potassium in a substance. In some instances, it is useful to alter an NPK value to change the ratio or amount of nutrients present in a fertilizer. The combination of one or more additives with anaerobic digestate allows for the alteration of the ratio or amount of nutrients in an anaerobic digestate based organic fertilizer.

As used herein, the term "liquid fish products" includes fish hydrolysate and fish soluble by-product. In one embodiment, fish hydrolysate includes enzyme-digested fish, which is created by adding an enzyme that virtually "dissolves" fish by-products into an enzyme digested fish solution. In one embodiment, fish soluble by-product includes a fish by-product resulting from fish and fish parts such as guts, heads, scales, and bones that have been heated, filtered, and stabilized.

The term concentrated separator by-product includes a by-product of the de-sugaring of beet molasses. As a result of this de-sugaring, proteins and minerals in the beet molasses are concentrated to form concentrated separator by-product, which is commonly used as livestock feed. The present Inventor discovered that, contrary to conventional wisdom and practice in the art, heat-treating concentrated separator by-product denatures the heat labile vegetable proteins contained in the concentrated separator by-product sufficiently to allow additional nitrogen to become bioavailable. See Evans, U.S. Pat. No. 7,927,397. Likewise, phosphorous apparently becomes more available as both the original de-sugaring process and the added heat-treatment process break down vegetative nucleosides.

To his surprise, the present Inventor discovered that including heat-treated concentrated separator by-product in fertilizer products resulted in a fertilizer product having significantly increased bioavailable nitrogen, potassium and phosphorous in a readily pumpable, or low viscosity, fluid state.

The term betaine includes an N-trimethylated amino acid produced as a by-product of de-sugaring beet molasses. Betaine has been historically used as a feed additive for many animal species. Despite being readily available, betaine was not considered an economically viable fertilizer component by traditional agricultural teachings because of its initial expense, its relatively small percentage of available nitrogen, and the belief that betaine could not satisfy the USDA National Organic Program regulations to be an organic fertilizer nutrient.

According to this long-standing teaching in the art, the use of betaine as a fertilizer was prohibitively expensive and it was considered more cost effective for a user seeking fertilizer to purchase urea, which contains a higher percentage of nitrogen than betaine, than to purchase betaine. Consequently, given the expense of betaine and its relatively small percentage of nitrogen, traditional agriculture largely ignored betaine as a viable fertilizer. However, as a result of extensive research and experimentation, the Inventor discovered the unexpected result that properly processed, betaine can meet the USDA National Organic Program standards set forth below, and can therefore be used as an organic fertilizer. Once the Inventor realized that betaine can be processed to meet the USDA National Organic Program standards for an organic fertilizer, the Inventor realized that betaine has a special use and special value as an organic nitrogen source and that this discovered property more than justifies its expense.

As used herein, the term "organic fertilizer" means an ingredient or product that may be used in certified organic crop production in accordance with USDA National Organic Program standards.

Currently, 7 CFR 205.203 provides the practice standard for certified organic crop production. The regulations under 7 CFR 205.203 provide the following:

(a) The producer must select and implement tillage and cultivation practices that maintain or improve the physical, chemical, and biological condition of soil and minimize soil erosion.

(b) The producer must manage crop nutrients and soil fertility through rotations, cover crops, and the application of plant and animal materials.

(c) The producer must manage plant and animal materials to maintain or improve soil organic matter content in a manner that does not contribute to contamination of crops, soil, or water by plant nutrients, pathogenic organisms, heavy metals, or residues of prohibited substances. Animal and plant materials include:

(1) Raw animal manure, which must be composted unless it is:

(i) Applied to land used for a crop not intended for human consumption;

(ii) Incorporated into the soil not less than 120 days prior to the harvest of a product whose edible portion has direct contact with the soil surface or soil particles; or (iii) Incorporated into the soil not less than 90 days prior to the harvest of a product whose edible portion does not have direct contact with the soil surface or soil particles;

(2) Composted plant and animal materials produced through a process that:

(i) Established an initial C:N ratio of between 25:1 and 40:1; and (ii) Maintained a temperature of between 131° F. and 170° F. for 3 days using an in-vessel or static aerated pile system; or (iii) Maintained a temperature of between 131° F. and 170° F. for 15 days using a windrow composting system, during which period, the materials must be turned a minimum of five times.

(3) Uncomposted plant materials.

(d) A producer may manage crop nutrients and soil fertility to maintain or improve soil organic matter content in a manner that does not contribute to contamination of crops, soil, or water by plant nutrients, pathogenic organisms, heavy metals, or residues of prohibited substances by applying:

(1) A crop nutrient or soil amendment included on the National List of synthetic substances allowed for use in organic crop production;

(2) A mined substance of low solubility;

(3) A mined substance of high solubility: Provided, That, the substance is used in compliance with the conditions established on the National List of nonsynthetic materials prohibited for crop production;

(4) Ash obtained from the burning of a plant or animal material, except as prohibited in paragraph (e) of this section: Provided, That, the material burned has not been treated or combined with a prohibited substance or the ash is not included on the National List of nonsynthetic substances prohibited for use in organic crop production; and (5) A plant or animal material that has been chemically altered by a manufacturing process: Provided, that, the material is included on the National List of synthetic substances allowed for use in organic crop production established in § 205.601.

(e) The producer must not use:

(1) Any fertilizer or composted plant and animal material that contains a synthetic substance not included on the National List of synthetic substances allowed for use in organic crop production;

(2) Sewage sludge (biosolids) as defined in 40 CFR part 503; and (3) Burning as a means of disposal for crop residues produced on the operation: Except, That, burning may be used to suppress the spread of disease or to stimulate seed germination.

FIG. 1 shows a flow chart of a process for organic fertilization of agricultural vegetation using anaerobic digestate based organic fertilizer 100 in accordance with one embodiment. As shown in FIG. 1, the process for organic fertilization of agricultural vegetation using anaerobic digestate based organic fertilizer 100 begins at ENTER OPERA- TION 101 and process flow proceeds to OBTAIN ANAEROBIC DIGESTATE OPERATION 103.

In one embodiment, at OBTAIN ANAEROBIC DIGESTATE OPERATION 103, a quantity of anaerobic digestate is obtained.

In one embodiment, once a quantity of anaerobic digestate is obtained at OBTAIN ANAEROBIC DIGESTATE OPERATION 103, process flow proceeds to OBTAIN ONE OR MORE GRAIN BY-PRODUCTS OPERATION 104.

In one embodiment, at OBTAIN ONE OR MORE GRAIN BY-PRODUCTS OPERATION 104, a quantity of one or more grain by-products are obtained. As noted above, in various embodiments, grain by-products include corn steep liquor, wet distillers grains, dried distillers grains with solubles, fermented grain solubles, corn condensed distillers solubles, and/or any other grain by-products as known in the art at the time of filing and/or as developed after the time of filing.

In one embodiment, once a quantity of one or more grain by-products is obtained at OBTAIN ONE OR MORE GRAIN BY-PRODUCTS OPERATION 104, process flow proceeds to CREATE A PH ADJUSTED ANAEROBIC DIGESTATE BASED ORGANIC FERTILIZER PRODUCT OPERATION 105.

In one embodiment, at CREATE A PH ADJUSTED ANAEROBIC DIGESTATE BASED ORGANIC FERTILIZER PRODUCT OPERATION 105, a pH adjusted anaerobic digestate based organic fertilizer product is created. In various embodiments, an anaerobic digestate based organic fertilizer is created by combining the anaerobic digestate of OBTAIN ANAEROBIC DIGESTATE OPERATION 103 and the one or more grain by-products of OBTAIN ONE OR MORE GRAIN BY-PRODUCTS OPERATION 104 to create a combination of anaerobic digestate and one or more grain by-products. In one embodiment, the combination of anaerobic digestate and one or more grain by-products is optionally heat-treated and cooled grain by-products to yield the pH adjusted anaerobic digestate based organic fertilizer product.

In one embodiment, once a pH adjusted anaerobic digestate based organic fertilizer product is created at CREATE A PH ADJUSTED ANAEROBIC DIGESTATE BASED ORGANIC FERTILIZER PRODUCT OPERATION 105, process flow proceeds to DELIVER AND/OR APPLY THE PH ADJUSTED ANAEROBIC DIGESTATE BASED ORGANIC FERTILIZER PRODUCT OPERATION 107.

In one embodiment, at DELIVER AND/OR APPLY THE PH ADJUSTED ANAEROBIC DIGESTATE BASED ORGANIC FERTILIZER PRODUCT OPERATION 107, the pH adjusted anaerobic digestate based organic fertilizer product of CREATE A PH ADJUSTED ANAEROBIC DIGESTATE BASED ORGANIC FERTILIZER PRODUCT OPERATION 105 is transferred in bulk to a tanker truck and/or disposed into drums for delivery of smaller quantities of the pH adjusted anaerobic digestate based organic fertilizer product. In one embodiment, at DELIVER AND/OR APPLY THE PH ADJUSTED ANAEROBIC DIGESTATE BASED ORGANIC FERTILIZER PRODUCT OPERATION 107, the pH adjusted anaerobic digestate based organic fertilizer product of CREATE A PH ADJUSTED ANAEROBIC DIGESTATE BASED ORGANIC FERTILIZER PRODUCT OPERATION 105 is then delivered to farms for application to agricultural vegetation.

In one embodiment, at DELIVER AND/OR APPLY THE PH ADJUSTED ANAEROBIC DIGESTATE BASED ORGANIC FERTILIZER PRODUCT OPERATION 107, a quantity of the pH adjusted anaerobic digestate based organic fertilizer product of CREATE A PH ADJUSTED ANAEROBIC DIGESTATE BASED ORGANIC FERTILIZER PRODUCT OPERATION 105 is offloaded into plastic field tanks located at or near the application site. In one embodiment, at DELIVER AND/OR APPLY THE PH ADJUSTED ANAEROBIC DIGESTATE BASED ORGANIC FERTILIZER PRODUCT OPERATION 107, the plastic field tanks are then used to feed the pH adjusted anaerobic digestate based organic fertilizer product of CREATE A PH ADJUSTED ANAEROBIC DIGESTATE BASED ORGANIC FERTILIZER PRODUCT OPERATION 105 into an irrigation stream either by direct injection or by vacuum drawing from the irrigation flow.

Depending on the particular agricultural vegetation requirements, the application rate of the pH adjusted anaerobic digestate based organic fertilizer product of CREATE A PH ADJUSTED ANAEROBIC DIGESTATE BASED ORGANIC FERTILIZER PRODUCT OPERATION 105 at DELIVER AND/OR APPLY THE PH ADJUSTED ANAEROBIC DIGESTATE BASED ORGANIC FERTILIZER PRODUCT OPERATION 107 may be anywhere in a range of approximately 5 to 4000 gallons per acre.

In one embodiment, at DELIVER AND/OR APPLY THE PH ADJUSTED ANAEROBIC DIGESTATE BASED ORGANIC FERTILIZER PRODUCT OPERATION 107 the pH adjusted anaerobic digestate based organic fertilizer product of CREATE A PH ADJUSTED ANAEROBIC DIGESTATE BASED ORGANIC FERTILIZER PRODUCT OPERATION 105 may also be directly sprayed onto the agricultural vegetation without concerns of plant burning as may occur with more concentrated inorganic fertilizers.

In one embodiment, once the pH adjusted anaerobic digestate based organic fertilizer product of CREATE A PH ADJUSTED ANAEROBIC DIGESTATE BASED ORGANIC FERTILIZER PRODUCT OPERATION 105 is delivered and applied at DELIVER AND/OR APPLY THE PH ADJUSTED ANAEROBIC DIGESTATE BASED ORGANIC FERTILIZER PRODUCT OPERATION 107, process flow proceeds to EXIT OPERATION 130 and the process for organic fertilization of agricultural vegetation using anaerobic digestate 100 is exited.

Using the process for organic fertilization of agricultural vegetation using anaerobic digestate 100, contrary to conventional teachings, a pH adjusted anaerobic digestate based organic fertilizer product is provided that is environmentally benign; is non-pathogenic; is derived from natural organic sources; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

In accordance with one embodiment, a process for production of a pH adjusted anaerobic digestate based organic fertilizer product includes combining anaerobic digestate with one or more grain by-products. In one embodiment, the combination of anaerobic digestate and one or more grain by-products is optionally filtered. In various embodiments, filtering removes suspended particulate matter. In one embodiment, the combination of anaerobic digestate and one or more grain by-products is heat-treated. In one embodiment, the heat-treated combination of anaerobic digestate and one or more grain by-products is cooled to yield the pH adjusted anaerobic digestate based organic fertilizer product. In one embodiment, the pH adjusted anaerobic digestate based organic fertilizer product is applied to agricultural vegetation, either directly or by inclusion in an irrigation stream.

Figure 2:
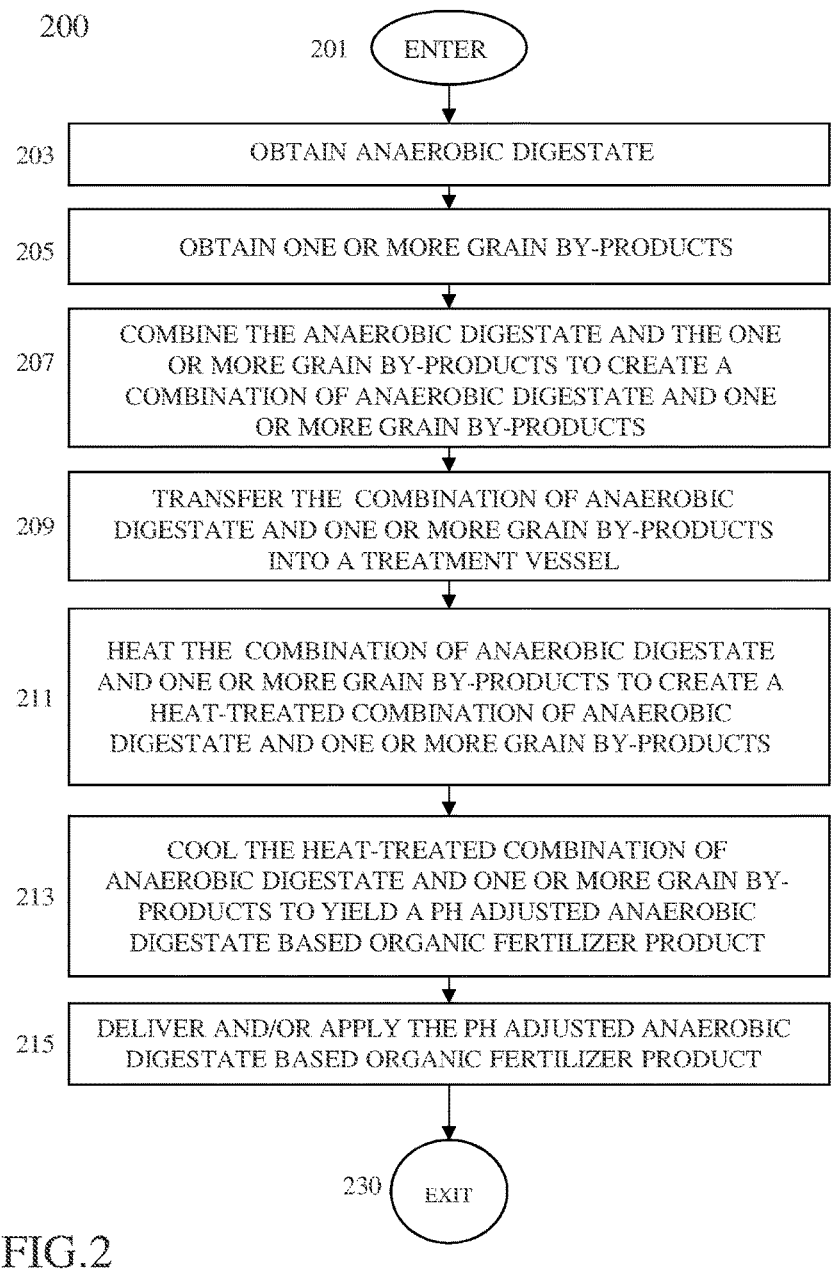
FIG. 2 is a flow chart of a process for creating a pH adjusted anaerobic digestate based organic fertilizer product from anaerobic digestate and one or more grain by-products, in accordance with one embodiment.

FIG. 2 is a flow chart of a process for creating a pH adjusted anaerobic digestate based organic fertilizer product from anaerobic digestate and one or more grain by-products, in accordance with one embodiment. As shown in FIG. 2, a process for production of a pH adjusted anaerobic digestate based organic fertilizer product from anaerobic digestate and one or more grain by-products 200 begins at ENTER OPERATION 201 and process flow proceeds to OBTAIN ANAEROBIC DIGESTATE OPERATION 203.

In various embodiments, the anaerobic digestate of OBTAIN ANAEROBIC DIGESTATE OPERATION 203 is, as discussed above, a by-product of anaerobic digestion of waste products such as livestock manure, municipal wastewater solids, food waste, industrial wastewater and residuals, fats, oils, and grease.

In one embodiment, once the anaerobic digestate is obtained at OBTAIN ANAEROBIC DIGESTATE OPERATION 203, process flow proceeds to OBTAIN ONE OR MORE GRAIN BY-PRODUCTS OPERATION 205.

In one embodiment, the one or more grain by-products of OBTAIN ONE OR MORE GRAIN BY-PRODUCTS OPERATION 205 include, but are not limited to, corn steep liquor, wet distillers grains, dried distillers grains with solubles, fermented grain solubles, corn condensed distillers solubles, and/or any other grain by-product as known in the art at the time of filing and/or as developed after the time of filing.

After one or more grain by-products are obtained at OBTAIN ONE OR MORE GRAIN BY-PRODUCTS OPERATION 205, process flow proceeds to COMBINE THE ANAEROBIC DIGESTATE AND THE ONE OR MORE GRAIN BY-PRODUCTS TO CREATE A COMBINATION OF ANAEROBIC DIGESTATE AND ONE OR MORE GRAIN BY-PRODUCTS OPERATION 207, in one embodiment. According to one embodiment, at COMBINE THE ANAEROBIC DIGESTATE AND THE ONE OR MORE GRAIN BY-PRODUCTS TO CREATE A COMBINATION OF ANAEROBIC DIGESTATE AND ONE OR MORE GRAIN BY-PRODUCTS OPERATION 207, at least a portion of the obtained anaerobic digestate and at least of a portion of the obtained one or more grain by-products are combined.

In one embodiment, the anaerobic digestate is combined with the one or more grain by-products such that the resulting combination of anaerobic digestate and one or more grain by-products is 10% to 90% anaerobic digestate. In one embodiment, the anaerobic digestate is combined with the one or more grain by-products such that the resulting combination of anaerobic digestate and one or more grain by-products is 10% to 90% grain by-products.

In other embodiments, at COMBINE THE ANAEROBIC DIGESTATE AND THE ONE OR MORE GRAIN BY-PRODUCTS TO CREATE A COMBINATION OF ANAEROBIC DIGESTATE AND ONE OR MORE GRAIN BY-PRODUCTS OPERATION 207, the anaerobic digestate is combined with the one or more grain by-products such that the resulting combination of anaerobic digestate and one or more grain by-products is any desired percentage concentration of anaerobic digestate, typically as determined by cost and the specific needs of the user including the desired pH of the resulting pH adjusted anaerobic digestate based organic fertilizer product.

In one embodiment, at COMBINE THE ANAEROBIC DIGESTATE AND THE ONE OR MORE GRAIN BY-PRODUCTS TO CREATE A COMBINATION OF ANAEROBIC DIGESTATE AND ONE OR MORE GRAIN BY-PRODUCTS OPERATION 207, the combination of anaerobic digestate and one or more grain by-products is optionally filtered. For example, the combination of anaerobic digestate and one or more grain by-products may not be filtered if the amount of suspended particulate matter is minimal. If filtration is desired, a stainless steel, or other suitable material, mesh having a mesh size number between 50 and 200 may be employed. In one embodiment, the mesh size is 200.

In one embodiment, combining the anaerobic digestate and the one or more grain by-products at COMBINE THE ANAEROBIC DIGESTATE AND THE ONE OR MORE GRAIN BY-PRODUCTS TO CREATE A COMBINATION OF ANAEROBIC DIGESTATE AND ONE OR MORE GRAIN BY-PRODUCTS OPERATION 207 yields the resulting pH adjusted anaerobic digestate based organic fertilizer product.

In one embodiment, once the anaerobic digestate and one or more grain by-products are combined at COMBINE THE ANAEROBIC DIGESTATE AND THE ONE OR MORE GRAIN BY-PRODUCTS TO CREATE A COMBINATION OF ANAEROBIC DIGESTATE AND ONE OR MORE GRAIN BY-PRODUCTS OPERATION 207, process flow proceeds to TRANSFER THE COMBINATION OF ANAEROBIC DIGESTATE AND ONE OR MORE GRAIN BY-PRODUCTS INTO A TREATMENT VESSEL OPERATION 209.

In various embodiments, at TRANSFER THE COMBINATION OF ANAEROBIC DIGESTATE AND ONE OR MORE GRAIN BY-PRODUCTS INTO A TREATMENT VESSEL OPERATION 209, at least a portion of the combination of anaerobic digestate and one or more grain by-products is transferred into one or more treatment vessels.

In one embodiment, at TRANSFER THE COMBINATION OF ANAEROBIC DIGESTATE AND ONE OR MORE GRAIN BY-PRODUCTS INTO A TREATMENT VESSEL OPERATION 209, the combination of anaerobic digestate and one or more grain by-products is filtered as the combination of anaerobic digestate and one or more grain by-products is disposed into the treatment vessel. In one embodiment, this filtering is optional. For example, the combination of anaerobic digestate and one or more grain by-products may not be filtered if the amount of suspended particulate matter is minimal. If pre-treatment filtration is desired, a stainless steel, or other suitable material, mesh having a mesh size number between 50 and 200 may be employed. In one embodiment, the mesh size is 200.

In one embodiment, once at least a portion of the combination of anaerobic digestate and one or more grain by-products is placed in one or more treatment vessels at TRANSFER THE COMBINATION OF ANAEROBIC DIGESTATE AND ONE OR MORE GRAIN BY-PRODUCTS INTO A TREATMENT VESSEL OPERATION 209, process flow proceeds to HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211.

In one embodiment, at HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211, at least a portion of the combination of anaerobic digestate and one or more grain by-products of COMBINE THE ANAEROBIC DIGESTATE AND THE ONE OR MORE GRAIN BY-PRODUCTS TO CREATE A COMBINATION OF ANAEROBIC DIGESTATE AND ONE OR MORE GRAIN BY-PRODUCTS OPERATION 207 is mechanically heated.

In one embodiment, at HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211, heat is applied to the combination of anaerobic digestate and one or more grain by-products to raise the average temperature of the combination of anaerobic digestate and one or more grain by-products to at least 130 degrees F. This temperature range is known to inhibit pathogenic bacterial growth of the most common pathogens such as *Escherichia coli* O157:H7 and *Salmonella*.

In one embodiment, at HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211, the combination of anaerobic digestate and one or more grain by-products is maintained in the treatment vessel at or above 130 degrees F. for less than 4 hours. In one embodiment, at HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211, the combination of anaerobic digestate and one or more grain by-products is maintained in the treatment vessel at or above 130 degrees F. for at least 4 hours. In one embodiment, at HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211, the combination of anaerobic digestate and one or more grain by-products is maintained in the treatment vessel at or above 130 degrees F. for at least 24 hours to ensure uniform heat transfer to the combination of anaerobic digestate and one or more grain by-products. In one embodiment, the combination of anaerobic digestate and one or more grain by-products may be filtered as it is heated at HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211. In one embodiment, the heat-treatment of HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211 may be performed for 120 hours or more, if desired.

In one embodiment, water and/or other liquid may be blended with the combination of anaerobic digestate and one or more grain by-products at HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211 to meet the desired nitrogen per weight or volume requirements of the combination of anaerobic digestate and one or more grain by-products. In one embodiment, water and/or other liquid may also be used to recover losses due to evaporation during the heat-treatment process of HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211. Liquid blending is typically not required, but is rather an optional procedure.

In one embodiment, if at least a portion of the combination of anaerobic digestate and one or more grain by-products of COMBINE THE ANAEROBIC DIGESTATE AND THE ONE OR MORE GRAIN BY-PRODUCTS TO CREATE A COMBINATION OF ANAEROBIC DIGESTATE AND ONE OR MORE GRAIN BY-PRODUCTS OPERATION 207 is optionally heat-treated in the treatment vessel of TRANSFER THE COMBINATION OF ANAEROBIC DIGESTATE AND ONE OR MORE GRAIN BY-PRODUCTS INTO A TREATMENT VESSEL OPERATION 209 at HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211 to create a heat-treated combination of anaerobic digestate and one or more grain by-products, process flow proceeds to COOL THE HEAT-TREATED COMBINATION OF ANAEROBIC DIGESTATE AND ONE OR MORE GRAIN BY-PRODUCTS TO YIELD A PH ADJUSTED ANAEROBIC DIGESTATE BASED ORGANIC FERTILIZER PRODUCT OPERATION 213.

In one embodiment, at COOL THE HEAT-TREATED COMBINATION OF ANAEROBIC DIGESTATE AND ONE OR MORE GRAIN BY-PRODUCTS TO YIELD A PH ADJUSTED ANAEROBIC DIGESTATE BASED ORGANIC FERTILIZER PRODUCT OPERATION 213, the heat-treated combination of anaerobic digestate and one or more grain by-products of HEAT THE COMBINATION OF ANAEROBIC DIGESTATE AND ONE OR MORE GRAIN BY-PRODUCTS TO CREATE A HEAT-TREATED COMBINATION OF ANAEROBIC DIGESTATE AND ONE OR MORE GRAIN BY-PRODUCTS OPERATION 211 is allowed to cool in the treatment vessel of TRANSFER THE COMBINATION OF ANAEROBIC DIGESTATE AND ONE OR MORE GRAIN BY-PRODUCTS INTO A TREATMENT VESSEL OPERATION 209.

As noted, in one embodiment, the cooling at COOL THE HEAT-TREATED COMBINATION OF ANAEROBIC DIGESTATE AND ONE OR MORE GRAIN BY-PRODUCTS TO YIELD A PH ADJUSTED ANAEROBIC DIGESTATE BASED ORGANIC FERTILIZER PRODUCT OPERATION 213 yields the resulting pH adjusted anaerobic digestate based organic fertilizer product.

In one embodiment, once the heat-treated combination of anaerobic digestate and one or more grain by-products is cooled at COOL THE HEAT-TREATED COMBINATION OF ANAEROBIC DIGESTATE AND ONE OR MORE GRAIN BY-PRODUCTS TO YIELD A PH ADJUSTED ANAEROBIC DIGESTATE BASED ORGANIC FERTILIZER PRODUCT OPERATION 213 to yield the pH adjusted anaerobic digestate based organic fertilizer product, process flow proceeds to DELIVER AND/OR APPLY THE PH ADJUSTED ANAEROBIC DIGESTATE BASED ORGANIC FERTILIZER PRODUCT OPERATION 215.

In one embodiment, once the anaerobic digestate and the one or more grain by-products are combined at COMBINE THE ANAEROBIC DIGESTATE AND THE ONE OR MORE GRAIN BY-PRODUCTS TO CREATE A COMBINATION OF ANAEROBIC DIGESTATE AND ONE OR MORE GRAIN BY-PRODUCTS OPERATION 207 to yield the pH adjusted anaerobic digestate based organic fertilizer product, process flow proceeds to DELIVER AND/OR APPLY THE PH ADJUSTED ANAEROBIC DIGESTATE BASED ORGANIC FERTILIZER PRODUCT OPERATION 215.

In one embodiment, at DELIVER AND/OR APPLY THE PH ADJUSTED ANAEROBIC DIGESTATE BASED ORGANIC FERTILIZER PRODUCT OPERATION 215 the pH adjusted anaerobic digestate based organic fertilizer product is transferred in bulk to a tanker truck and/or transferred into drums for delivery of smaller quantities of the pH adjusted anaerobic digestate based organic fertilizer product. In one embodiment, at DELIVER AND/OR APPLY THE PH ADJUSTED ANAEROBIC DIGESTATE BASED ORGANIC FERTILIZER PRODUCT OPERATION 215, the pH adjusted anaerobic digestate based organic fertilizer product is then delivered to farms for application to agricultural vegetation.

In one embodiment, at DELIVER AND/OR APPLY THE PH ADJUSTED ANAEROBIC DIGESTATE BASED ORGANIC FERTILIZER PRODUCT OPERATION 215, a quantity of the pH adjusted anaerobic digestate based organic fertilizer product is offloaded into plastic field tanks located at or near the application site. In one embodiment, at DELIVER AND/OR APPLY THE PH ADJUSTED ANAEROBIC DIGESTATE BASED ORGANIC FERTILIZER PRODUCT OPERATION 215, the plastic field tanks are then used to feed the pH adjusted anaerobic digestate based organic fertilizer product into the irrigation stream either by direct injection or by vacuum drawing from the irrigation flow.

Depending on the particular agricultural vegetation requirements, the application rate of pH adjusted anaerobic digestate based organic fertilizer product at DELIVER AND/OR APPLY THE PH ADJUSTED ANAEROBIC DIGESTATE BASED ORGANIC FERTILIZER PRODUCT OPERATION 215 may be anywhere in a range of approximately 5 to 4000 gallons per acre.

In one embodiment, at DELIVER AND/OR APPLY THE PH ADJUSTED ANAEROBIC DIGESTATE BASED ORGANIC FERTILIZER PRODUCT OPERATION 215, the pH adjusted anaerobic digestate based organic fertilizer product may also be directly sprayed onto the agricultural vegetation without concerns of plant burning as may occur with more concentrated inorganic fertilizers.

In one embodiment, once the pH adjusted anaerobic digestate based organic fertilizer product is delivered and applied at DELIVER AND/OR APPLY THE PH ADJUSTED ANAEROBIC DIGESTATE BASED ORGANIC FERTILIZER PRODUCT OPERATION 215, process flow proceeds to EXIT OPERATION 230 and the process for production of a pH adjusted anaerobic digestate based organic fertilizer product from anaerobic digestate and one or more grain by-products 200 is exited.

Figure 3:
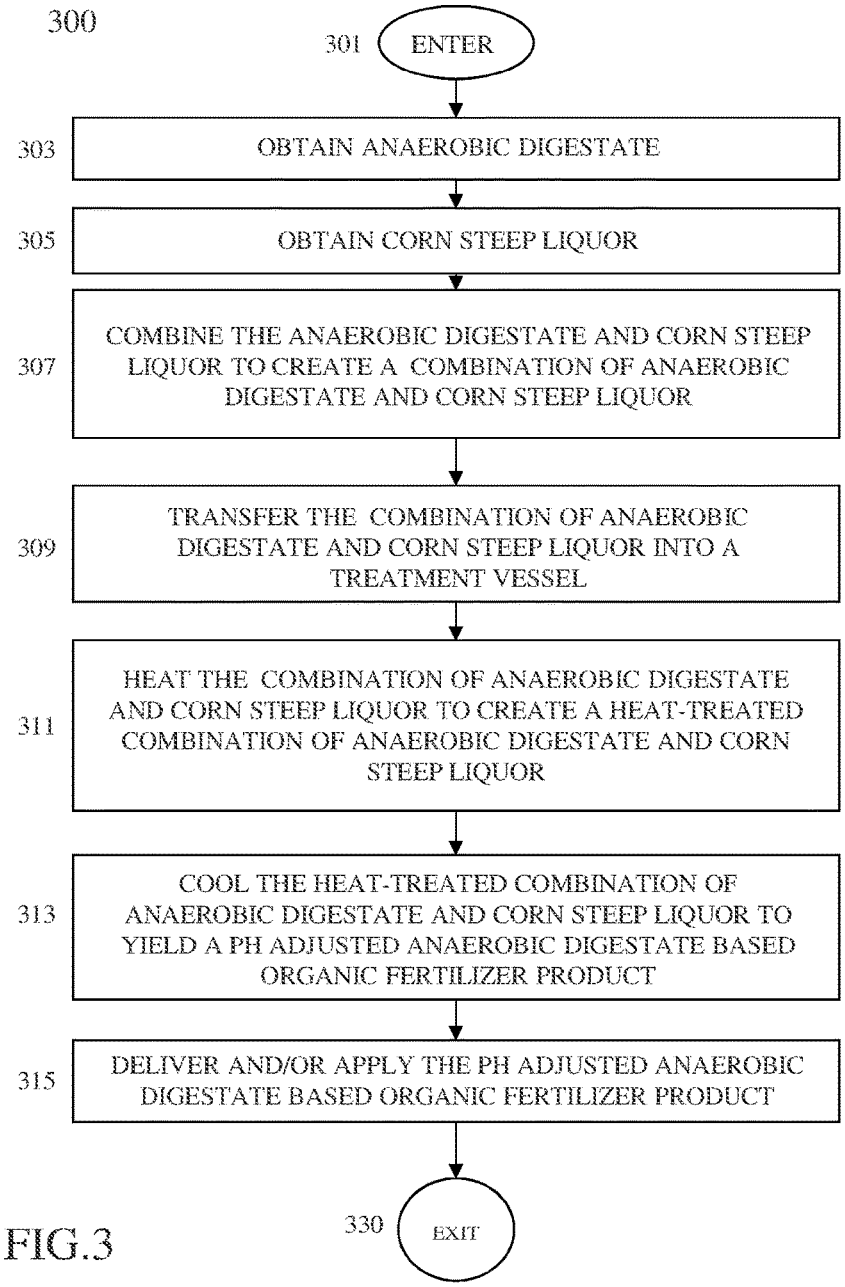
FIG. 3 is a flow chart of a process for creating a pH adjusted anaerobic digestate based organic fertilizer product from anaerobic digestate and corn steep liquor, in accordance with one embodiment.

FIG. 3 is a flow chart of a process for creating a pH adjusted anaerobic digestate based organic fertilizer product from anaerobic digestate and corn steep liquor, in accordance with one embodiment. As shown in FIG. 3, a process for production of a pH adjusted anaerobic digestate based organic fertilizer product from anaerobic digestate and corn steep liquor 300 begins at ENTER OPERATION 301 and process flow proceeds to OBTAIN ANAEROBIC DIGESTATE OPERATION 303.

The anaerobic digestate of OBTAIN ANAEROBIC DIGESTATE OPERATION 303 is, as discussed above, a by-product of anaerobic digestion of waste products.

In one embodiment, once the anaerobic digestate is obtained at OBTAIN ANAEROBIC DIGESTATE OPERATION 303, process flow proceeds to OBTAIN CORN STEEP LIQUOR OPERATION 305.

In one embodiment, the corn steep liquor of OBTAIN CORN STEEP LIQUOR OPERATION 305 is a by-product of corn wet-milling.

After corn steep liquor is obtained at OBTAIN CORN STEEP LIQUOR OPERATION 305, process flow proceeds to COMBINE THE ANAEROBIC DIGESTATE AND THE CORN STEEP LIQUOR TO CREATE A COMBINATION OF ANAEROBIC DIGESTATE AND CORN STEEP LIQUOR OPERATION 307, in one embodiment. According to one embodiment, at COMBINE THE ANAEROBIC DIGESTATE AND THE CORN STEEP LIQUOR TO CREATE A COMBINATION OF ANAEROBIC DIGESTATE AND CORN STEEP LIQUOR OPERATION 307, at least a portion of the obtained anaerobic digestate and at least of a portion of the obtained corn steep liquor are combined.

In one embodiment, the anaerobic digestate is combined with the corn steep liquor such that the resulting combination of anaerobic digestate and corn steep liquor is 10% to 90% anaerobic digestate. In one embodiment, the anaerobic digestate is combined with the corn steep liquor such that the resulting combination of anaerobic digestate and corn steep liquor is 10% to 90% corn steep liquor.

In other embodiments, at COMBINE THE ANAEROBIC DIGESTATE AND THE CORN STEEP LIQUOR TO CREATE A COMBINATION OF ANAEROBIC DIGESTATE AND CORN STEEP LIQUOR OPERATION 307, the anaerobic digestate is combined with the corn steep liquor such that the resulting combination of anaerobic digestate and corn steep liquor is any desired percentage concentration of anaerobic digestate, typically as determined by cost and the specific needs of the user including desired pH levels of the resulting pH adjusted anaerobic digestate based organic fertilizer product.

In one embodiment, at COMBINE THE ANAEROBIC DIGESTATE AND THE CORN STEEP LIQUOR TO CREATE A COMBINATION OF ANAEROBIC DIGESTATE AND CORN STEEP LIQUOR OPERATION 307, the combination of the anaerobic digestate and the corn steep liquor is optionally filtered. In one embodiment, a mesh having a mesh size number between 50 and 200 is used to filter the combination of the anaerobic digestate and the corn steep liquor. In one embodiment, combining the anaerobic digestate and the corn steep liquor at COMBINE THE ANAEROBIC DIGESTATE AND THE CORN STEEP LIQUOR TO CREATE A COMBINATION OF ANAEROBIC DIGESTATE AND CORN STEEP LIQUOR OPERATION 307 yields the resulting pH adjusted anaerobic digestate based organic fertilizer product.

In one embodiment, once the anaerobic digestate and corn steep liquor are combined at COMBINE THE ANAEROBIC DIGESTATE AND THE CORN STEEP LIQUOR TO CREATE A COMBINATION OF ANAEROBIC DIGESTATE AND CORN STEEP LIQUOR OPERATION 307, process flow proceeds to TRANSFER THE COMBINATION OF ANAEROBIC DIGESTATE AND CORN STEEP LIQUOR INTO A TREATMENT VESSEL OPERATION 309.

In various embodiments, at TRANSFER THE COMBINATION OF ANAEROBIC DIGESTATE AND CORN STEEP LIQUOR INTO A TREATMENT VESSEL OPERATION 309, at least a portion of the combination of anaerobic digestate and corn steep liquor is transferred into one or more treatment vessels.

In one embodiment, at TRANSFER THE COMBINATION OF ANAEROBIC DIGESTATE AND CORN STEEP LIQUOR INTO A TREATMENT VESSEL OPERATION 309, the combination of anaerobic digestate and corn steep liquor is filtered as the combination of anaerobic digestate and corn steep liquor is disposed into the treatment vessel. In one embodiment, this filtering is optional. For example, the combination of anaerobic digestate and corn steep liquor may not be filtered if the amount of suspended particulate matter is minimal. If pre-treatment filtration is desired, a stainless steel, or other suitable material, mesh having a mesh size number between 50 and 200 may be employed. In one embodiment, the mesh size is 200.

In one embodiment, once at least a portion of the combination of anaerobic digestate and corn steep liquor is placed in one or more treatment vessels at TRANSFER THE COMBINATION OF ANAEROBIC DIGESTATE AND CORN STEEP LIQUOR INTO A TREATMENT VESSEL OPERATION 309, process flow proceeds to HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311.

In one embodiment, at HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311, at least a portion of the combination of anaerobic digestate and corn steep liquor of COMBINE THE ANAEROBIC DIGESTATE AND THE CORN STEEP LIQUOR TO CREATE A COMBINATION OF ANAEROBIC DIGESTATE AND CORN STEEP LIQUOR OPERATION 307 is mechanically heated.

In one embodiment, at HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311, heat is optionally applied to the combination of anaerobic digestate and corn steep liquor to raise the average temperature of the combination of anaerobic digestate and corn steep liquor up to 130 degrees F. This temperature range is known to inhibit pathogenic bacterial growth of the most common pathogens such as *Escherichia coli* O157:H7 and *Salmonella*.

In one embodiment, at HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311, the combination of anaerobic digestate and corn steep liquor is maintained in the treatment vessel at or above 130 degrees F. for less than 4 hours. In one embodiment, at HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311, the combination of anaerobic digestate and corn steep liquor is maintained in the treatment vessel at or above 130 degrees F. for at least 4 hours. In one embodiment, at HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311, the combination of anaerobic digestate and corn steep liquor is maintained in the treatment vessel at or above 130 degrees F. for at least 24 hours to ensure uniform heat transfer to the combination of anaerobic digestate and corn steep liquor. In one embodiment, the combination of anaerobic digestate and corn steep liquor may be filtered as it is heated at HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311 as part of the treatment process. In one embodiment, the heat-treatment of HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311 may be performed for 120 hours or more, if desired.

In one embodiment, water and/or other liquid may be blended with the combination of anaerobic digestate and corn steep liquor at HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311 to meet the desired nitrogen per weight or volume requirements of the combination of anaerobic digestate and corn steep liquor. In one embodiment, water and/or other liquid may also be used to recover losses due to evaporation during the heat-treatment process of HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311. Liquid blending is typically not required, but is rather an optional procedure.

In one embodiment, if at least a portion of the combination of anaerobic digestate and corn steep liquor of COMBINE THE ANAEROBIC DIGESTATE AND THE CORN STEEP LIQUOR TO CREATE A COMBINATION OF ANAEROBIC DIGESTATE AND CORN STEEP LIQUOR OPERATION 307 is heat-treated in the treatment vessel of TRANSFER THE COMBINATION OF ANAEROBIC DIGESTATE AND CORN STEEP LIQUOR INTO A TREATMENT VESSEL OPERATION 309 at HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311 to create a heat-treated combination of anaerobic digestate and corn steep liquor, process flow proceeds to COOL THE HEAT-TREATED COMBINATION OF ANAEROBIC DIGESTATE AND CORN STEEP LIQUOR TO YIELD A PH ADJUSTED ANAEROBIC DIGESTATE BASED ORGANIC FERTILIZER PRODUCT OPERATION 313.

In one embodiment, at COOL THE HEAT-TREATED COMBINATION OF ANAEROBIC DIGESTATE AND CORN STEEP LIQUOR TO YIELD A PH ADJUSTED ANAEROBIC DIGESTATE BASED ORGANIC FERTILIZER PRODUCT OPERATION 313, the heat-treated combination of anaerobic digestate and corn steep liquor of HEAT THE COMBINATION OF ANAEROBIC DIGESTATE AND CORN STEEP LIQUOR TO CREATE A HEAT-TREATED COMBINATION OF ANAEROBIC DIGESTATE AND CORN STEEP LIQUOR OPERATION 311 is allowed to cool in the treatment vessel of TRANSFER THE COMBINATION OF ANAEROBIC DIGESTATE AND CORN STEEP LIQUOR INTO A TREATMENT VESSEL OPERATION 309.

As noted, in one embodiment, the cooling at COOL THE HEAT-TREATED COMBINATION OF ANAEROBIC DIGESTATE AND CORN STEEP LIQUOR TO YIELD A PH ADJUSTED ANAEROBIC DIGESTATE BASED ORGANIC FERTILIZER PRODUCT OPERATION 313 yields the resulting pH adjusted anaerobic digestate based organic fertilizer product.

In one embodiment, once the heat-treated combination of anaerobic digestate and corn steep liquor is cooled at COOL THE HEAT-TREATED COMBINATION OF ANAEROBIC DIGESTATE AND CORN STEEP LIQUOR TO YIELD A PH ADJUSTED ANAEROBIC DIGESTATE BASED ORGANIC FERTILIZER PRODUCT OPERATION 313 to yield the pH adjusted anaerobic digestate based organic fertilizer product, process flow proceeds to DELIVER AND/OR APPLY THE PH ADJUSTED ANAEROBIC DIGESTATE BASED ORGANIC FERTILIZER PRODUCT OPERATION 315.

In one embodiment, once the anaerobic digestate and the corn steep liquor is combined at COMBINE THE ANAEROBIC DIGESTATE AND THE CORN STEEP LIQUOR TO CREATE A COMBINATION OF ANAEROBIC DIGESTATE AND CORN STEEP LIQUOR OPERATION 307 to yield the resulting pH adjusted anaerobic digestate based organic fertilizer product, process flow proceeds to DELIVER AND/OR APPLY THE PH ADJUSTED ANAEROBIC DIGESTATE BASED ORGANIC FERTILIZER PRODUCT OPERATION 315.

In one embodiment, at DELIVER AND/OR APPLY THE PH ADJUSTED ANAEROBIC DIGESTATE BASED ORGANIC FERTILIZER PRODUCT OPERATION 315, the pH adjusted anaerobic digestate based organic fertilizer product is transferred in bulk to a tanker truck and/or transferred into drums for delivery of smaller quantities of the pH adjusted anaerobic digestate based organic fertilizer product. In one embodiment, at DELIVER AND/OR APPLY THE PH ADJUSTED ANAEROBIC DIGESTATE BASED ORGANIC FERTILIZER PRODUCT OPERATION 315, the pH adjusted anaerobic digestate based organic fertilizer product is then delivered to farms for application to agricultural vegetation.

In one embodiment, at DELIVER AND/OR APPLY THE PH ADJUSTED ANAEROBIC DIGESTATE BASED ORGANIC FERTILIZER PRODUCT OPERATION 315, a quantity of the pH adjusted anaerobic digestate based organic fertilizer product is offloaded into plastic field tanks located at or near the application site. In one embodiment, at DELIVER AND/OR APPLY THE PH ADJUSTED ANAEROBIC DIGESTATE BASED ORGANIC FERTILIZER PRODUCT OPERATION 315, the plastic field tanks are then used to feed the pH adjusted anaerobic digestate based organic fertilizer product into the irrigation stream either by direct injection or by vacuum drawing from the irrigation flow.

Depending on the particular agricultural vegetation requirements, the application rate of pH adjusted anaerobic digestate based organic fertilizer product at DELIVER AND/OR APPLY THE PH ADJUSTED ANAEROBIC DIGESTATE BASED ORGANIC FERTILIZER PRODUCT OPERATION 315 may be anywhere in a range of approximately 5 to 4000 gallons per acre.

In one embodiment, at DELIVER AND/OR APPLY THE PH ADJUSTED ANAEROBIC DIGESTATE BASED ORGANIC FERTILIZER PRODUCT OPERATION 315, the pH adjusted anaerobic digestate based organic fertilizer product may also be directly sprayed onto the agricultural vegetation without concerns of plant burning as may occur with more concentrated inorganic fertilizers.

In one embodiment, once the pH adjusted anaerobic digestate based organic fertilizer product is delivered and applied at DELIVER AND/OR APPLY THE PH ADJUSTED ANAEROBIC DIGESTATE BASED ORGANIC FERTILIZER PRODUCT OPERATION 315, process flow proceeds to EXIT OPERATION 330 and the process for production of a pH adjusted anaerobic digestate based organic fertilizer product from anaerobic digestate and corn steep liquor 300 is exited.

Figure 4:
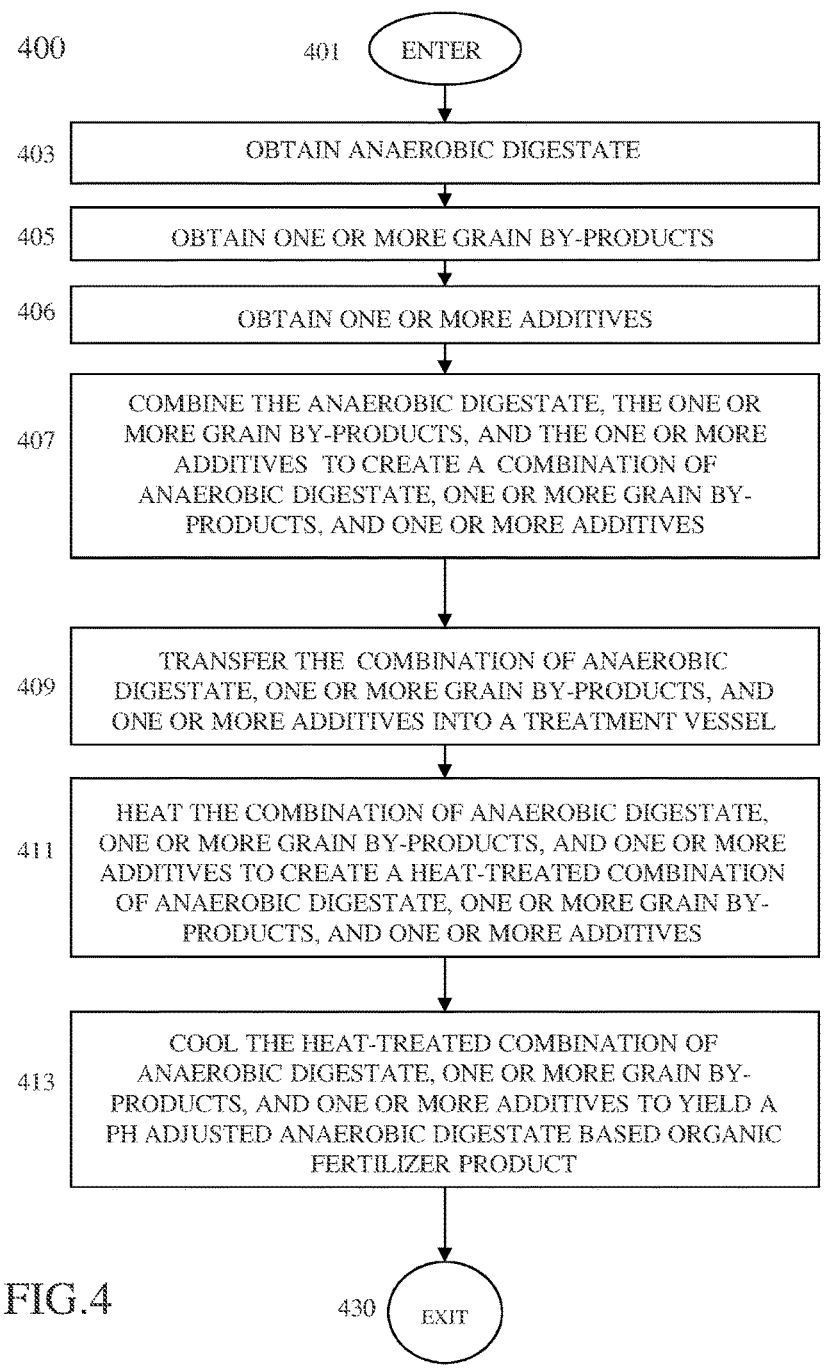
FIG. 4 is a flow chart of a process for creating a pH adjusted anaerobic digestate based organic fertilizer product from anaerobic digestate, one or more grain by-products, and one or more additives, in accordance with one embodiment.

FIG. 4 is a flow chart of a process for creating a pH adjusted anaerobic digestate based organic fertilizer product from anaerobic digestate, one or more grain by-products, and one or more additives, in accordance with one embodiment. As shown in FIG. 4, a process for production of a pH adjusted anaerobic digestate based organic fertilizer product from anaerobic digestate, one or more grain by-products, and one or more additives 400 begins at ENTER OPERATION 401 and process flow proceeds to OBTAIN ANAEROBIC DIGESTATE OPERATION 403.

The anaerobic digestate of OBTAIN ANAEROBIC DIGESTATE OPERATION 403 is, as discussed above, a by-product of anaerobic digestion of waste products. In one embodiment, once the anaerobic digestate is obtained at OBTAIN ANAEROBIC DIGESTATE OPERATION 403, process flow proceeds to OBTAIN ONE OR MORE GRAIN BY-PRODUCTS OPERATION 405.

In one embodiment, once the one or more grain by-products are obtained at OBTAIN ONE OR MORE GRAIN BY-PRODUCTS OPERATION 405, process flow proceeds to OBTAIN ONE OR MORE ADDITIVES OPERATION 406.

In various embodiments, the one or more additives of OBTAIN ONE OR MORE ADDITIVES OPERATION 406 include, but are not limited to, liquid fish products; concentrated separator by-product; betaine; sulfuric acid; sulfate; phosphoric acid; phosphate; calcium sulfate; gypsum; boron; boric acid; calcium phosphate; bone meal; hard-rock phosphate; soft-rock phosphate; calcium carbonate; limestone; and/or any other additives as known in the art at the time of filing and/or as developed after the time of filing. In various embodiments, liquid fish products include, but are not limited to, fish hydrolysate and fish soluble by-product. In one embodiment, fish hydrolysate includes enzyme-digested fish, which is created by adding an enzyme that virtually "dissolves" fish by-products into an enzyme digested fish solution. In one embodiment, fish soluble by-product includes a fish by-product resulting from fish and fish parts such as guts, heads, scales, and bones that have been heated, filtered, and stabilized.

In one embodiment, concentrated separator by-product includes a by-product of the de-sugaring of beet molasses.

In one embodiment, betaine includes an N-trimethylated amino acid produced as a by-product of de-sugaring beet molasses.

After one or more additives are obtained at OBTAIN ONE OR MORE ADDITIVES OPERATION 406, process flow proceeds to COMBINE THE ANAEROBIC DIGESTATE, THE ONE OR MORE GRAIN BY-PRODUCTS, AND THE ONE OR MORE ADDITIVES TO CREATE A COMBINATION OF ANAEROBIC DIGESTATE, ONE OR MORE GRAIN BY-PRODUCTS, AND ONE OR MORE ADDITIVES OPERATION 407, in one embodiment. According to one embodiment, at COMBINE THE ANAEROBIC DIGESTATE, THE ONE OR MORE GRAIN BY-PRODUCTS, AND THE ONE OR MORE ADDITIVES TO CREATE A COMBINATION OF ANAEROBIC DIGESTATE, ONE OR MORE GRAIN BY-PRODUCTS, AND ONE OR MORE ADDITIVES OPERATION 407, at least a portion of the obtained anaerobic digestate and at least of a portion of the obtained concentrated separator by-product are combined.

In one embodiment, the anaerobic digestate is combined with the one or more grain by-products and the one or more additives such that the resulting combination of anaerobic digestate, one or more grain by-products, and one or more additives is 10% to 90% anaerobic digestate. In one embodiment, the anaerobic digestate is combined with the one or more grain by-products and the one or more additives such that the resulting combination of anaerobic digestate, one or more grain by-products, and one or more additives is 10% to 90% one or more grain by-products. In one embodiment, the anaerobic digestate is combined with the one or more grain by-products and the one or more additives such that the resulting combination of anaerobic digestate, one or more grain by-products, and one or more additives is 10% to 90% one or more additives.

In other embodiments, at COMBINE THE ANAEROBIC DIGESTATE, THE ONE OR MORE GRAIN BY-PRODUCTS, AND THE ONE OR MORE ADDITIVES TO CREATE A COMBINATION OF ANAEROBIC DIGESTATE, ONE OR MORE GRAIN BY-PRODUCTS, AND ONE OR MORE ADDITIVES OPERATION 407, the anaerobic digestate is combined the one or more grain by-products and the one or more additives such that the resulting combination of anaerobic digestate, one or more grain by-products, and one or more additives is any desired percentage concentration of anaerobic digestate, typically as determined by cost and the specific needs of the user.

In one embodiment, at COMBINE THE ANAEROBIC DIGESTATE, THE ONE OR MORE GRAIN BY-PRODUCTS, AND THE ONE OR MORE ADDITIVES TO CREATE A COMBINATION OF ANAEROBIC DIGESTATE, ONE OR MORE GRAIN BY-PRODUCTS, AND ONE OR MORE ADDITIVES OPERATION 407, the combination of anaerobic digestate, one or more grain by-products, and one or more additives is optionally filtered. In one embodiment, combining the anaerobic digestate, the one or more grain by-products, and the one or more additives at COMBINE THE ANAEROBIC DIGESTATE, THE ONE OR MORE GRAIN BY-PRODUCTS, AND THE ONE OR MORE ADDITIVES TO CREATE A COMBINATION OF ANAEROBIC DIGESTATE, ONE OR MORE GRAIN BY-PRODUCTS, AND ONE OR MORE ADDITIVES OPERATION 407 yields the resulting anaerobic digestate based organic fertilizer.

In one embodiment, once the anaerobic digestate, the one or more grain by-products, and the one or more additives is combined at COMBINE THE ANAEROBIC DIGESTATE, THE ONE OR MORE GRAIN BY-PRODUCTS, AND THE ONE OR MORE ADDITIVES TO CREATE A COMBINATION OF ANAEROBIC DIGESTATE, ONE OR MORE GRAIN BY-PRODUCTS, AND ONE OR MORE ADDITIVES OPERATION 407 to yield the pH adjusted anaerobic digestate based organic fertilizer product, process flow proceeds to EXIT OPERATION 430 and the process for production of a pH adjusted anaerobic digestate based organic fertilizer product from anaerobic digestate, one or more grain by-products, and one or more additives 400 is exited.

In one embodiment, once the anaerobic digestate, one or more grain by-products, and one or more additives are combined at COMBINE THE ANAEROBIC DIGESTATE, THE ONE OR MORE GRAIN BY-PRODUCTS, AND THE ONE OR MORE ADDITIVES TO CREATE A COMBINATION OF ANAEROBIC DIGESTATE, ONE OR MORE GRAIN BY-PRODUCTS, AND ONE OR MORE ADDITIVES OPERATION 407, process flow proceeds to TRANSFER THE COMBINATION OF ANAEROBIC DIGESTATE, ONE OR MORE GRAIN BY-PRODUCTS, AND ONE OR MORE ADDITIVES INTO A TREATMENT VESSEL OPERATION 409.

In various embodiments, at TRANSFER THE COMBINATION OF ANAEROBIC DIGESTATE, ONE OR MORE GRAIN BY-PRODUCTS, AND ONE OR MORE ADDITIVES INTO A TREATMENT VESSEL OPERATION 409, at least a portion of the combination of anaerobic digestate, one or more grain by-products, and one or more additives is transferred into one or more treatment vessels.

In one embodiment, at TRANSFER THE COMBINATION OF ANAEROBIC DIGESTATE, ONE OR MORE GRAIN BY-PRODUCTS, AND ONE OR MORE ADDITIVES INTO A TREATMENT VESSEL OPERATION 409, the combination of anaerobic digestate, one or more grain by-products, and one or more additives is filtered as the combination of anaerobic digestate, one or more grain by-products, and one or more additives is disposed into the treatment vessel. In one embodiment, this filtering is optional. If pre-treatment filtration is desired, a stainless steel, or other suitable material, mesh having a mesh size number between 50 and 200 may be employed. In one embodiment, the mesh size is 200.

In one embodiment, once at least a portion of the combination of anaerobic digestate, one or more grain by-products, and one or more additives is placed in one or more treatment vessels at TRANSFER THE COMBINATION OF ANAEROBIC DIGESTATE, ONE OR MORE GRAIN BY-PRODUCTS, AND ONE OR MORE ADDITIVES INTO A TREATMENT VESSEL OPERATION 409, process flow proceeds to HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411.

In one embodiment, at HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411, at least a portion of the combination of anaerobic digestate, one or more grain by-products, and one or more additives of COMBINE THE ANAEROBIC DIGESTATE, THE ONE OR MORE GRAIN BY-PRODUCTS, AND THE ONE OR MORE ADDITIVES TO CREATE A COMBINATION OF ANAEROBIC DIGESTATE, ONE OR MORE GRAIN BY-PRODUCTS, AND ONE OR MORE ADDITIVES OPERATION 407 is mechanically heated.

In one embodiment, at HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411, heat is optionally applied to the combination of anaerobic digestate, one or more grain by-products, and one or more additives to raise the average temperature of the combination of anaerobic digestate, one or more grain by-products, and one or more additives to at least 130 degrees F.

In one embodiment, at HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411, the combination of anaerobic digestate, one or more grain by-products, and one or more additives is maintained in the treatment vessel at or above 130 degrees F. for less than 4 hours. In one embodiment, at HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411, the combination of anaerobic digestate, one or more grain by-products, and one or more additives is maintained in the treatment vessel at or above 130 degrees F. for at least 4 hours. In one embodiment, at HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411, the combination of anaerobic digestate, one or more grain by-products, and one or more additives is maintained in the treatment vessel at or above 130 degrees F. for at least 24 hours to ensure uniform heat transfer to the combination of anaerobic digestate, one or more grain by-products, and one or more additives. In one embodiment, the combination of anaerobic digestate, one or more grain by-products, and one or more additives may be filtered as it is heated at HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411. In one embodiment, the heat-treatment of HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411 may be performed for 120 hours or more, if desired.

In one embodiment, water may be blended with the combination of anaerobic digestate, one or more grain by-products, and one or more additives at HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411 to meet the desired nitrogen per weight or volume requirements of the combination of the combination of anaerobic digestate, one or more grain by-products, and one or more additives. In one embodiment, water may also be used to recover losses due to evaporation during the heat-treatment process of HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411.

In one embodiment, if at least a portion of the combination of anaerobic digestate, one or more grain by-products, and one or more additives of COMBINE THE ANAEROBIC DIGESTATE, THE ONE OR MORE GRAIN BY-PRODUCTS, AND THE ONE OR MORE ADDITIVES TO CREATE A COMBINATION OF ANAEROBIC DIGESTATE, ONE OR MORE GRAIN BY-PRODUCTS, AND ONE OR MORE ADDITIVES OPERATION 407 is heat-treated in the treatment vessel of TRANSFER THE COMBINATION OF ANAEROBIC DIGESTATE, ONE OR MORE GRAIN BY-PRODUCTS, AND ONE OR MORE ADDITIVES INTO A TREATMENT VESSEL OPERATION 409 at HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411 to create a heat-treated combination of anaerobic digestate, one or more grain by-products, and one or more additives, process flow proceeds to COOL THE HEAT-TREATED COMBINATION OF ANAEROBIC DIGESTATE, ONE OR MORE GRAIN BY-PRODUCTS, AND ONE OR MORE ADDITIVES TO YIELD A PH ADJUSTED ANAEROBIC DIGESTATE BASED ORGANIC FERTILIZER PRODUCT OPERATION 413.

In one embodiment, at COOL THE HEAT-TREATED COMBINATION OF ANAEROBIC DIGESTATE, ONE OR MORE GRAIN BY-PRODUCTS, AND ONE OR MORE ADDITIVES TO YIELD A PH ADJUSTED ANAEROBIC DIGESTATE BASED ORGANIC FERTILIZER PRODUCT OPERATION 413, the heat-treated combination of anaerobic digestate, one or more grain by-products, and one or more additives of HEAT THE COMBINATION OF ANAEROBIC DIGESTATE, ONE OR MORE GRAIN BY-PRODUCTS, AND ONE OR MORE ADDITIVES TO CREATE A HEAT-TREATED COMBINATION OF ANAEROBIC DIGESTATE, ONE OR MORE GRAIN BY-PRODUCTS, AND ONE OR MORE ADDITIVES OPERATION 411 is allowed to cool in the treatment vessel of TRANSFER THE COMBINATION OF ANAEROBIC DIGESTATE, ONE OR MORE GRAIN BY-PRODUCTS, AND ONE OR MORE ADDITIVES INTO A TREATMENT VESSEL OPERATION 409.

As noted, in one embodiment, the cooling at COOL THE HEAT-TREATED COMBINATION OF ANAEROBIC DIGESTATE, ONE OR MORE GRAIN BY-PRODUCTS, AND ONE OR MORE ADDITIVES TO YIELD A PH ADJUSTED ANAEROBIC DIGESTATE BASED ORGANIC FERTILIZER PRODUCT OPERATION 413 yields the resulting pH adjusted anaerobic digestate based organic fertilizer product.

In one embodiment, once the heat-treated combination of anaerobic digestate, one or more grain by-products, and one or more additives is cooled at COOL THE HEAT-TREATED COMBINATION OF ANAEROBIC DIGESTATE, ONE OR MORE GRAIN BY-PRODUCTS, AND ONE OR MORE ADDITIVES TO YIELD A PH ADJUSTED ANAEROBIC DIGESTATE BASED ORGANIC FERTILIZER PRODUCT OPERATION 413 to yield the pH adjusted anaerobic digestate based organic fertilizer product, process flow proceeds to EXIT OPERATION 430 and the process for production of a pH adjusted anaerobic digestate based organic fertilizer product from anaerobic digestate, one or more grain by-products, and one or more additives 400 is exited.

Using the processes described above, a pH adjusted anaerobic digestate based organic fertilizer product is provided that is environmentally benign; is non-pathogenic; is derived from natural organic sources; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

It should be noted that the language used in the specification has been primarily selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, portions of one or more of the process steps and/or operations can be re-grouped as portions of one or more other of the process steps and/or operations discussed herein. Consequently, the particular order and/or grouping of the process steps and/or operations discussed herein do not limit the scope of the invention as claimed below.

In addition, the operations shown in the figures are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A process of manufacturing a pH adjusted anaerobic digestate based organic fertilizer product comprising:
    obtaining a quantity of anaerobic digestate;
    obtaining a quantity of one or more grain by-products;
    combining at least part of the quantity of the anaerobic digestate and at least part of the quantity of the one or more grain by-products to yield a combination of anaerobic digestate and one or more grain by-products, the combination of the anaerobic digestate and the one or more grain by-products comprising the pH adjusted anaerobic digestate based organic fertilizer product; and
    filtering at least a part of the combination of the anaerobic digestate and the one or more grain by-products using a filter having a standard wire mesh size number in a range of 50 to 200.

2. The process of manufacturing the pH adjusted anaerobic digestate based organic fertilizer product of claim 1, wherein the anaerobic digestate is a by-product of anaerobic digestion of waste products.

3. The process of manufacturing the pH adjusted anaerobic digestate based organic fertilizer product of claim 1, wherein at least of one of the one or more grain by-products is selected from the following group of grain by-products:
    corn steep liquor;
    wet distillers grains;
    dried distillers grains with solubles;
    fermented grain solubles; or
    corn condensed distillers solubles.

4. The process of manufacturing the pH adjusted anaerobic digestate based organic fertilizer product of claim 1, wherein at least one of the one or more grain by-products is corn steep liquor.

5. The process of manufacturing the pH adjusted anaerobic digestate based organic fertilizer product of claim 1, wherein the combination of the anaerobic digestate and the one or more grain by-products is 10% to 90% anaerobic digestate.

6. The process of manufacturing the pH adjusted anaerobic digestate based organic fertilizer product of claim 1, further comprising:
    filtering at least a part of the combination of the anaerobic digestate and the one or more grain by-products using a filter having a standard wire mesh size number of 200.

7. The process of manufacturing the pH adjusted anaerobic digestate based organic fertilizer product of claim 1, further comprising:
    heat-treating the combination of the anaerobic digestate and the one or more grain by-products to yield a heat-treated combination of the anaerobic digestate and the one or more grain by-products; and
    cooling the heat-treated combination of the anaerobic digestate and the one or more grain by-products to yield the pH adjusted anaerobic digestate based organic fertilizer product.

8. The process of manufacturing the pH adjusted anaerobic digestate based organic fertilizer product of claim 7, wherein heat-treating the combination of the anaerobic digestate and the one or more grain by-products to yield the heat-treated combination of the anaerobic digestate and the one or more grain by-products comprises heating the combination of the anaerobic digestate and the one or more grain by-products to 130 degrees F.

9. The process of manufacturing the pH adjusted anaerobic digestate based organic fertilizer product of claim 7, further comprising:
    filtering at least a portion of the heat-treated combination of the anaerobic digestate and the one or more grain by-products using a filter having a standard wire size number in a range of 50 to 200.

10. The process of manufacturing the pH adjusted anaerobic digestate based organic fertilizer product of claim 1, wherein the pH adjusted anaerobic digestate based organic fertilizer product includes a nitrogen content in a range of 1 to 10 percent.

11. The process of manufacturing the pH adjusted anaerobic digestate based organic fertilizer product of claim 1, wherein the pH adjusted anaerobic digestate based organic fertilizer product includes a phosphate content in a range of 0.5 to 2.5 percent.

12. The process of manufacturing the pH adjusted anaerobic digestate based organic fertilizer product of claim 1, wherein the pH adjusted anaerobic digestate based organic fertilizer product includes a potassium content in a range of 1 to 7 percent.

* * * * *